United States Patent

Delage et al.

[11] Patent Number: 5,602,953
[45] Date of Patent: Feb. 11, 1997

[54] COMPOSITE COMMUNICATION CABLE

[75] Inventors: Peter Delage; Uwe Koch, both of Mönchengladbach; Peter Zamzow, Bochum; Klaus Nothofer, Erkrath, all of Germany

[73] Assignee: Kabel Rheydt AG, Germany

[21] Appl. No.: 199,834

[22] Filed: Feb. 22, 1994

[30] Foreign Application Priority Data

Feb. 24, 1993 [DE] Germany .................. 43 05 635.0

[51] Int. Cl.$^6$ ...................................... G02B 6/44
[52] U.S. Cl. .................. 385/101; 385/100; 385/112; 385/114; 174/27
[58] Field of Search ................... 385/100–114, 115; 174/117 F, 117 R, 27, 70 A

[56] References Cited

U.S. PATENT DOCUMENTS

| | | | |
|---|---|---|---|
| 3,887,265 | 6/1975 | Margolis et al. | 385/101 X |
| 4,468,089 | 8/1984 | Brorein | 385/101 X |
| 4,741,594 | 5/1988 | Suzuki | 385/115 |
| 5,039,195 | 8/1991 | Jenkins et al. | 385/101 |
| 5,180,890 | 1/1993 | Pendergrass et al. | 174/117 F |

*Primary Examiner*—Rodney B. Bovernick
*Assistant Examiner*—Phan T. H. Palmer
*Attorney, Agent, or Firm*—Ware, Fressola, Van Der Sluys & Adolphson

[57] ABSTRACT

A communication cable includes a plurality of strands that are interconnected by cross pieces which can be easily separated from each other such that each strand can be used as independent cables. At least one strand of the communication cable includes at least one electrical communication line and at least one optical communication line.

10 Claims, 1 Drawing Sheet

COMPOSITE COMMUNICATION CABLE

BACKGROUND OF THE INVENTION

The present invention generally relates to a communication cable and, in particular, relates to one such communication cable having a plurality of strands, each strand having an outer jacket interconnected to adjacent outer jackets by cross pieces such that each strand is able to be used as an independent communication cable.

In general, a communication cable is known from DE 39 37 804 C2, for example. Therein, an optical waveguide having a number of strands is fabricated as a flat cable. A majority of the strands include units that can be used individually. The flat cable described includes a jacketed optical communication line along with a bundled lead or a ribbon cable. The individual strands of the optical communication cable are surrounded by a common jacket and are interconnected by separable cross pieces. The other strands of the communication cable contain pull-proof elements, which make it possible to provide the optical elements with pull relief. Such a communication cable can be used for the low-cost installation of very reliable broad-band communication networks in residential areas.

However, in existing local area networks, the communication connections cannot simply be converted from electrical communication lines to optical communication lines. One reason is that not every subscriber utilizes the broadband services. As a result, in many instances it is presently more economical to retain the conventional copper or aluminum, i.e. electrical technology, wiring for such uses as carrier frequency (TF) transmission via four-wire lines, pulse code modulation (PCM) transmission through coaxial fines, or the like, in addition to the optical communication elements.

Consequently, it is highly desireable to provide a communication cable that can provide both broadband optical communication services on demand as well as conventional electrical communication.

SUMMARY OF THE INVENTION

Accordingly, it is one object of the present invention to provide a communication cable wherein multiple strands of both optical communication lines (LWL optical waveguides) and electrical communication lines are integrated in the communication cable.

This object is accomplished, at least in part, by a communication cable having a plurality of strands, at least one such strand includes at least one electrical communication line and at least one optical communication line within the strand.

A communication cable having both an optical communication line and an electrical communication line provides the distinct advantage that subscriber connections thereto can be selectively made either electrically or optically in the local area network. Hence, subscriber connections can be made in accordance with demand and the existing infrastructure. Another advantage of such a communication cable is that the individual strands can be easily separated without use of special tools. Furthermore, no special sleeves or the like are required for the separation of the communication cable into individual strands. Such a communication cable can be pulled in a simple manner through tubes and adapts well to the cross-section of the tube. Further, because of the metal conductors in the electrical communication line, separate crush protection can be omitted for the communication cable. In one simplified arrangement of the communication cable, at least one of the strands of the communication cable includes exactly one electrical communication line and one optical communication line to be used for subscriber connections.

In one particular embodiment, the communication cable is constructed in the form of a flat cable. Such an arrangement enables the communication cable to be readily and easily layed down.

Preferably, to enhance the simple and cost-effective production of the communication cable, it is advantageous to form the cross pieces interconnecting the outer jackets of the individual strands out of the same material as that used to form the outer jackets themselves.

Other objects and advantages will become apparent to those skilled in the art from the following detailed description read in conjunction with the appended claims and the drawings attached hereto.

BRIEF DESCRIPTION OF THE DRAWINGS

The drawings, not drawn to scale, include.

DETAILED DESCRIPTION OF THE INVENTION

Figure 1:
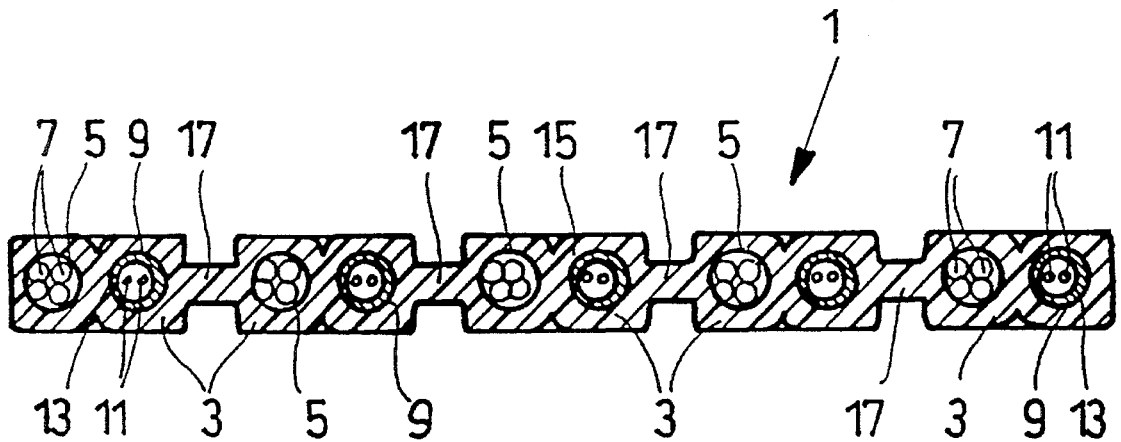
FIG. 1 which is a cross-sectional view of a communication cable embodying the principles of the present invention.

As shown in FIG. 1, a communication cable, generally indicated at 1 in the Figures and embodying the principles of the present invention, includes a plurality of strands 3. Preferably, at least one of the plurality of strands 3 includes one electrical communication line 5 and one optical communication line 9. In the preferred embodiment, the individual strands 3 are interconnected by cross pieces 17, such that they are easily separated from each other for use as independent cables. Preferably, the cable 1 is designed for telephone, data and TV transmission and is waterproof along its length. In the embodiment shown in FIG. 1, the communication cable 1 is constructed in the form of a flat cable, for example, in which the plurality of strands 3 are arranged parallel to each other in a single plane.

In one specific embodiment, as shown in FIG. 1, the cable 1 includes five strands 3 each of which includes an electrical communication line 5 with twisted leads 7 containing a copper wire conductor for telephone transmission, and an optical communication line 9 in the form of a bundled lead with two optical waveguides 11 each for example, which are loosely placed in a plastic shell 13. In this particular embodiment, the electrical communication lines 5 and the optical communication lines 9 of all strands 3 run parallel to each other in one plane. The cable 1 is also provided with a common outer jacket 15 that is the same material as the cross pieces 17 that interconnect the individual strands 3 with each other. Preferably, the common outer jacket 15 is formed from a waterproof material.

Figure 2:
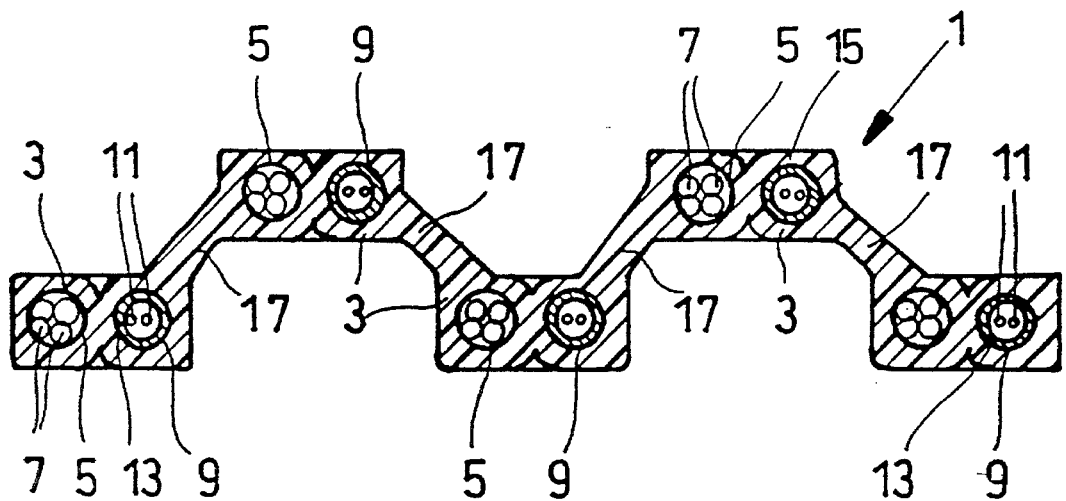
FIG. 2 a cross-sectional view of another communication cable, also embodying the principles of the present invention.

Referring to FIG. 2, wherein previously described elements are identified with the same reference numeral, a communication cable 1 is shown which differs from the first configuration example in FIG. 1 in that the plurality of strands 3, each containing an electrical communication line 5 and an optical communication line 9, are parallel to each other in the communication cable 1 but lie in more than one plane. In this configuration, alternating strands 3 are disposed in a first plane and the adjacent, intermediate, strands 3 are disposed in a second plane that is parallel to the first plane of the communication cable 1. It will be understood that the strands 3 can be disposed in more than two different parallel planes.

Although the present invention has been described herein with respect to one or more specific embodiments it will be understood that other arrangements and configurations can also be made that do not depart from the spirit and scope of the present invention. Hence, the present invention is deemed limited only by the appended claims and the reasonable interpretation thereof.

What is claimed is:

1. A composite communication cable, said cable comprising:
   a plurality of strands, each said strand having an outer jacket, said outer jackets being connected to adjacent outer jackets by a cross-piece, each one of said strands including at least one electrical communication line and an optical communication line.

2. The composite communication cable as claimed in claim 1, wherein each one of said strands contains at least one optical communication line.

3. The composite communication cable as claimed in claim 2, wherein each said strand includes exactly one electrical communication line and one optical communication line.

4. The composite communication cable as claimed in claim 3, wherein said composite communication cable is a flat cable.

5. The composite communication cable as claimed in claim 1, wherein said composite communication cable is a flat cable.

6. The composite communication cable as claimed in claim 5, wherein said electrical communication lines and said optical communication lines of said strands run parallel to each other in one plane.

7. The composite communication cable as claimed in claim 5, wherein said strands are disposed next to each other in one plane.

8. The composite communication cable as claimed in claim 5, wherein said strands are offset next to each other.

9. The composite communication cable is claimed in claim 1 wherein said cross-pieces are parallel to said strands.

10. The composite communication cable as claimed in claim 1, wherein said cross pieces and said outer jackets are the same material.

* * * * *

UNITED STATES PATENT AND TRADEMARK OFFICE
CERTIFICATE OF CORRECTION

PATENT NO.  : 5,602,953
DATED       : Feb. 11, 1997
INVENTOR(S) : Delage et al.

It is certified that error appears in the above-indentified patent and that said Letters Patent is hereby corrected as shown below:

Column 1, line 34 (Background of the Invention) "fines" should read --lines--

Signed and Sealed this

Sixth Day of May, 1997

Attest:

BRUCE LEHMAN

*Attesting Officer*          Commissioner of Patents and Trademarks